United States Patent [19]

Flach

[11] Patent Number: 4,680,431
[45] Date of Patent: Jul. 14, 1987

[54] DATA NETWORK INTERFACE MODULE WITH CIRCUITRY FOR DISCONNECTING A MODULE THAT HAS LOST SUPPLY VOLTAGE

[75] Inventor: Werner Flach, Amberg, Fed. Rep. of Germany

[73] Assignee: Siemens Aktiengesellschaft, Berlin and Munich, Fed. Rep. of Germany

[21] Appl. No.: 805,325

[22] Filed: Dec. 5, 1985

[30] Foreign Application Priority Data

Dec. 13, 1984 [DE] Fed. Rep. of Germany ....... 3445521

[51] Int. Cl.⁴ .................. H04L 25/02; H04B 3/44
[52] U.S. Cl. .................. 178/69 R; 178/69 G
[58] Field of Search .......... 178/71, 69 R, 69 G, 178/2 C, 2 R; 179/170 F, 170 R

[56] References Cited

U.S. PATENT DOCUMENTS 3,581,075  5/1971  Mattsson et al. .............. 178/69 R

OTHER PUBLICATIONS

"Bus-fähige Schnittstelle nach RS 485/422", by Ing.(-grad.) Hans-Peter Abendroth, Elektronik, Jun. 15, 1984, pp. 97-98.

Primary Examiner—Stafford D. Schreyer
Attorney, Agent, or Firm—Kenyon & Kenyon

[57] ABSTRACT

The invention relates to an interface module for the bidirectional transmission of data streams in a data network with separate power supplies for the individual bus stations. According to the invention, means are provided for bridging the bus station, preferably via normally closed contacts of a relay connected to the supply voltage and for simulating the ready condition if the power supply in the interface module fails. The latter consists of an OR circuit which is supplied on the one hand, via an operational amplifier and an RC section, with a constant delay and, on the other hand, via an optical coupler taking off the input signal, and a Schmitt trigger connected thereto.

13 Claims, 3 Drawing Figures

DATA NETWORK INTERFACE MODULE WITH CIRCUITRY FOR DISCONNECTING A MODULE THAT HAS LOST SUPPLY VOLTAGE

BACKGROUND OF THE INVENTION

1. Field of the Invention

The invention relates to an interface module for the bidirectional transmission of data streams in a data network with separate power supplies for the individual bus stations.

2. Related Art

In the Journal "Elektronik" 12/June 15, 1984, Bus Systems, pages 97–98, there is shown an interface module with which line sections of up to several kilometers can be realized with separate supplies. However, if the bus participants are distributed over large distances and are supplied from separate power supplies, the entire bus traffic might be shut down if the power supply of one individual participant is switched off.

SUMMARY OF THE INVENTION

It is therefore an object of the invention to improve the known interface module so that in the event of a failure of the power supplies of individual participants, the entire bus traffic is not affected adversely for the remaining participants. This is achieved in a simple manner by the provision of means in the interface module for bridging the bus station and for simulating a bus ready state in the event of power supply failure. The means for bridging the bus station accommodates power supply failure in the central stations; to accommodate failure of the power supplies in the stations located at the ends of a bus, the means for simulating the ready state is provided. These consist advantageously of an OR circuit which is acted upon by a signal which is conducted from the differential receiver of the interface module and is delayed by an RC stage, and by a signal which is connected parallel to the input of the differential amplifier and is generated by an optical coupler. This apparatus automatically terminates the bus at a central bus station should the power supplies fail in the stations closer to the bus extremity. The highly stable delay times of the RC stage, which can be enhanced still further by a following operational amplifier, permit the use of an inexpensive optical coupler with greatly asymmetrical delay times. In order to achieve a certain amount of hysteresis for the optical coupler, it is advantageous if the optical coupler is followed by a Schmitt trigger. For bridging a bus station, the interface module advantageously includes a relay with four normally closed contacts, which relay is excited by the power supply of the bus station.

BRIEF DESCRIPTION OF THE DRAWINGS

An embodiment of the invention will be described, making reference to the drawing, in which.

DETAILED DESCRIPTION

Figure 1:
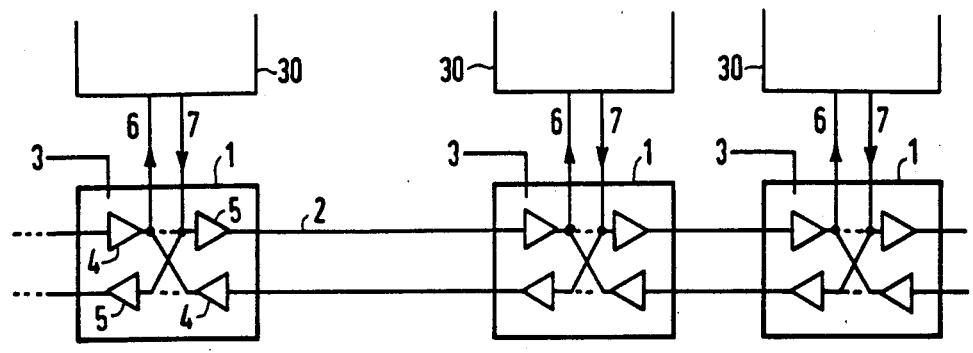
FIG. 1 shows schematically the data network with two bus end stations and one central station each with their corresponding interface modules.

The data network shown in FIG. 1 consists of interface modules 1 which are connected to each other by a bidirectional differential finger-like bus line 2 and which supply the bus stations 30 with data signals. Each individual interface modules includes a power supply 3, two differential receivers 4 and two differential transmitters 5. The station 30 communicates with the interface modules via station receive lines 6 and station transmit lines 7.

Figure 2:
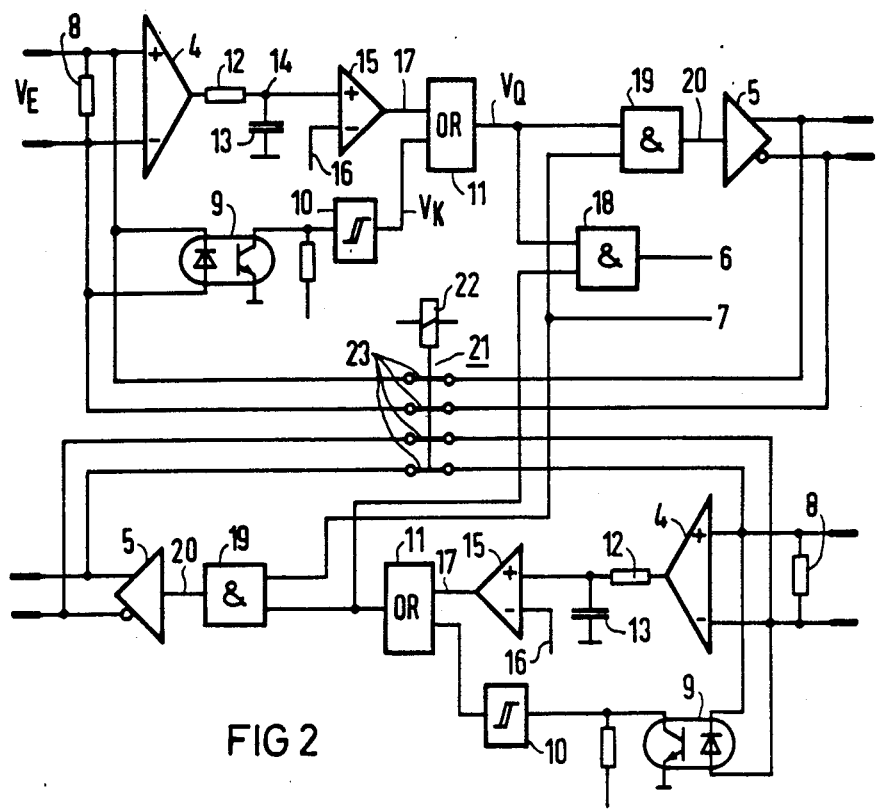
FIG. 2 shows schematically an interface module according to the invention, including coupling electronics and automatic bus termination and bridging electronics.

As is shown in FIG. 2, the interface module is largely symmetrical in that the top half of the circuit carries a signal from left to right, whereas the bottom half carries a signal from right to left. Only the top half will be described, therefore, and the bottom half will be understood to be identical except where otherwise noted.

Referring to the top half of the circuit of FIG. 2, the inputs of the differential receiver 4 are shunted by a resistor 8 which converts the current signal on the differential input lines to a voltage signal for sensing by the differential receiver 4. Parallel therewith is connected an optical coupler 9 having a transistor output. The emitter of the transistor output is connected to power supply ground, and the collector is connected through a resistor to the positive power supply voltage. The collector is also connected through a non-inverting Schmitt trigger 10 to one input of an OR gate 11. The output of the differential receiver 4 is connected through a resistor 12 to a junction point 14, which is connected through a capacitor 13 to ground, and also to one input of a comparator 15. The other input 16 of the comparator 15 is supplied with a reference voltage. The output 17 of comparator 15 provides the second input for OR gate 11. The output of OR gate 11 connects to one input of an AND gate 19, the other input of which is connected to the station transmit line 7. The same station transmit line 7 is also connected to the corresponding input of the corresponding AND gate 19 in the bottom half of the circuit of FIG. 2. The output 20 of the AND gate 19 provides the input for the differential transmitter 5. The output of OR gate 11, in addition to being connected to AND gate 19, is also connected to one input of an AND gate 18. The other input of AND gate 18 is connected to the output of the corresponding OR gate 11 in the bottom half of the circuit of FIG. 2. The output of AND gate 18 is connected to the station receive line 6.

For bridging the bus station in the event of a power failure, an electromagnetic relay 21 is provided in the interface module. The coil 22 of the relay is connected across the power supply 3 of the module, and two normally closed contact arms 23 connect the differential bus lines at the output of differential amplifier 5 directly to the bus lines at the input of differential amplifier 4 when the power supply 3 is off. Two additional normally closed contact arms 23 provide the same function for the bottom half of the circuit of FIG. 2, and all four arms may be enclosed in a single relay and operated by the single coil 22.

If the power supply fails in a bus station or series of bus stations at the end of the bus, the above bridging circuit will bring only invalid signals to the next more central bus station. In order to simulate the ready state in that bus station, the circuit consisting of the RC stage 12 and 13, the optical coupler 9, the Schmitt trigger 10 and the OR gate 11 are provided. The operation of this circuit can be seen from FIG. 3. The upper waveform shows the input voltage $V_E$ at the differential receiver 4 which can vary between a positive and a negative maximum value. These are valid states. The second waveform shows the voltage $V_k$ which constitutes the voltage after the Schmitt trigger 10. It can be seen that the switching times of the optical coupler 9 have a great spread as far as the bus is concerned. The voltage waveform $V_Q$ is shifted relative to voltage waveform $V_E$ by the time tv due to the action of the RC section 12, 13. This shift remains constant, preventing the uncertain switching times of the optical coupler 9 from affecting the normal operation of the bus. The data stream, while it is delayed if several bus participants are connected in series, it is not distorted. This delay is possible for transmission with a fixed baud rate of up to 100 kHz.

Figure 3:
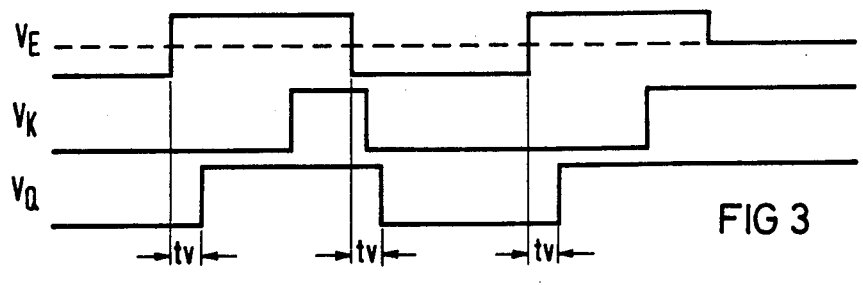
FIG. 3 shows a timing diagram of individual signals for simulating the ready state in the event that the power supply has failed.

If now the differential current at the input of the differential receiver 4 fails, such as through failure of the power supply in the more extreme module(s), the optical coupler 9 connects, after a delay time of about 30 microseconds, the rest level 1 to the AND stages 18 and 19 and keeps the bus therefore ready for operation, which can also be seen from the end of the diagram of FIG. 3.

The invention thus makes it possible to terminate a data network with relatively simple and inexpensive commercially available components in the event of a decoupled bus station or a failing power supply, and to thereby keep the data network overall ready for operation. The voltages required for this function, especially the reference voltage 16, can even be taken from a neighboring station which is operational, since they are at relatively low current levels. Without the last-described circuit the transmitting line would no longer be supplied with a differential current at a station at the end of the bus; the receiver connected thereto would merely receive undefined or interference signals and bring the data traffic of the other participants to a halt.

I claim:

1. An interface module for connecting a bus station with a data network, comprising a first receive portion for receiving a first input signal from a first input line on the data network, the first input signal being capable of at least one of a plurality of valid states including a first ready state, the first receive portion comprising means for simulating the first ready state at the output of the first receive portion if the first input signal is not in a valid state.

2. An interface module in accordance with claim 1, wherein the data network is bidirectional, further comprising a second receive portion for receiving a second input signal from a second input line on the data network, the second input signal being capable of at least one of a plurality of valid states including a second ready state, the second receive portion comprising means for simulating the second ready state at the output of the second receive portion if the second input signal is not in a valid state.

3. An interface module according to claim 1, wherein the means for simulating the first ready state at the output of the first receive portion comprises:
   first detection means for detecting whether the first input signal is in a valid state; and
   first gate means, responsive to the first detection means, for delivering to the output of the first receive portion the first input signal if it is in a valid state or a first ready state signal if the first input signal is not in a valid state.

4. An interface module according to claim 2, wherein the means for simulating the first ready state at the output of the first receive portion comprises:
   first detection means for detecting whether the first input signal is in a valid state; and
   first gate means, responsive to the first detection means, for delivering to the output of the first receive portion of the first input signal if it is in a valid state or a first ready state signal if the first input signal is not in a valid state; and
   wherein the means for simulating the second ready state at the output of the second receive portion comprises:
   second detection means for detecting whether the second input signal is in a valid state; and
   second gate means, responsive to the second detection means, for delivering to the output of the second receive portion the second input signal if it is in a valid state or a second ready state signal if the second input signal is not in a valid state.

5. An interface module according to claim 3, wherein the first input line is differential and the first detection means comprises an optical isolator connected to the first input line.

6. An interface module according to claim 1, wherein the means for simulating the first ready state at the output of the first receive portion comprises:
   first detection means for detecting whether the first input signal is in a valid state;
   a first delay stage connected to the first input line; and
   first gate means, responsive to the first detection means, for delivering to the output of the first receive portion the output of the first delay stage if the first input signal is in a valid state or a first ready state signal if the first input signal is not in a valid state.

7. An interface module according to claim 2, wherein the means for simulating the first ready state at the output of the first receive portion comprises:
   first detection means for detecting whether the first input signal is in a valid state;
   a first delay stage connected to the first input line; and
   first gate means, responsive to the first detection means, for delivering to the output of the first receive portion the output of the first delay stage if the first input signal is in a valid state or a first ready state signal if the first input signal is not in a valid state; and
   wherein the means for simulating and second ready state at the output of the second receive portion comprises:
   second detection means for detecting whether the second input signal is in a valid state;
   a second delay stage connected to the second input line; and
   second gate means, responsive to the second detection means, for delivering to the output of the second receive portion the output of the second delay stage if the second input signal is in a valid state or a second ready state signal if the second input is not in a valid state.

8. An interface module according to claim 6, wherein the first input line is differential and the first detection means comprises an optical isolator connected to the input line.

9. An interface module for receiving a first input signal from a first input line of a data network and transmitting a first output signal onto a first output line of the data network, the first input signal being capable of at least one of a plurality of valid states including a first ready state, the interface module comprising:

a first receive portion connected to the first input line;

a first transmit portion connected to the first output line; and means for connecting the input of the first transmit portion to the output of the first receive portion;

wherein the first receive portion comprises means for simulating the first ready state at the output of the first receive portion if the first input signal is not in a valid state, and wherein the interface module further comprises means for connecting the output of the first transmit portion to the input of the first receive portion in response to the absence of a power supply voltage.

10. An interface module according to claim 9, wherein the data network is bidirectional, and further for receiving a second input signal from a second input line of the data network and transmitting a second output signal onto a second output line of the data network, the second input signal being capable of at least one of a plurality of valid states including a second ready state, the interface module further comprising:

a second receive portion connected to the second input line;

a second transmit portion connected to the second output line; and means for connecting the input of the second transmit portion to the output of the second receive portion;

wherein the second receive portion comprises means for simulating the second ready state at the output of the second receive portion if the second input signal is not in valid state, and wherein the interface module further comprises means for connecting the output of the second transmit portion to the input of the second receive portion in response to the absence of a power supply voltage.

11. An interface module according to claim 9, wherein the means for simulating the first ready state at the output of the first receive portion comprises:

first detection means for detecting whether the first input signal is in a valid state; and first gate means, responsive to the first detection means, for delivering to the output of the first receive portion the first input signal if it is in a valid state or a first ready state signal if the first input signal is not in a valid state.

12. An interface module according to claim 10, wherein the means for simulating the first steady state at the output of the first receive portion comprises:

first detection means for detecting whether the first input signal is in a valid state; and first gate means, responsive to the first detection means, for delivering to the output of the first receive portion the first input signal if it is in a valid state or a first ready state signal if the first input signal is not in a valid state; and wherein the means for simulating the second ready state at the output of the second receive portion comprises;

second detection means for detecting whether the second input signal is in a valid state; and second state means, responsive to the second detection means, for delivering to the output of the second receive portion the second input signal if it is in a valid state or a second ready state signal if the second input signal ia not in a valid state.

13. An interface module according to claim 9, wherein the first input line is differential and the means for simulating the first ready state at the output of the first receive portion comprises:

an optical isolator connected to the first input line for detecting whether the first input signal is in a valid state;

a delay stage connected to the first input line; and gate means, responsive to the optical isolator, for delivering to the output of the first receive portion the output of the delay stage if the first input signal is in a valid state or a first ready state signal if the first input signal is not in a valid state.

* * * * *